June 6, 1961 C. N. HAY 2,987,350
SEPARATOR FOR ANTIFRICTION BEARING
Filed Feb. 12, 1959
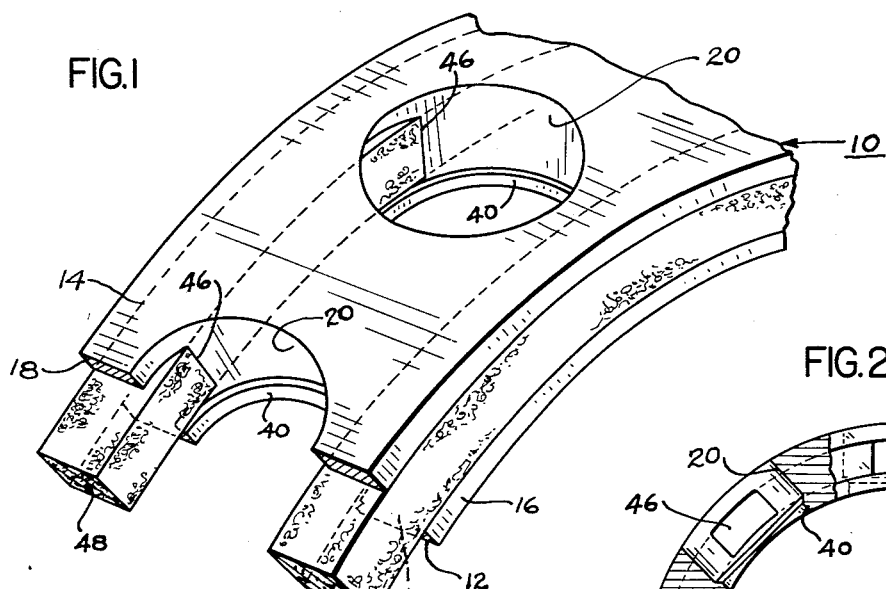
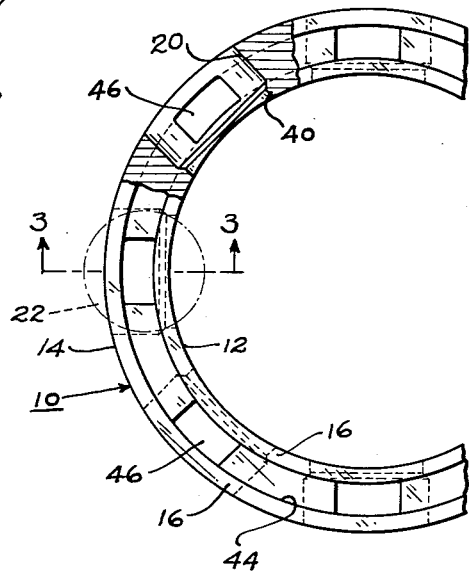
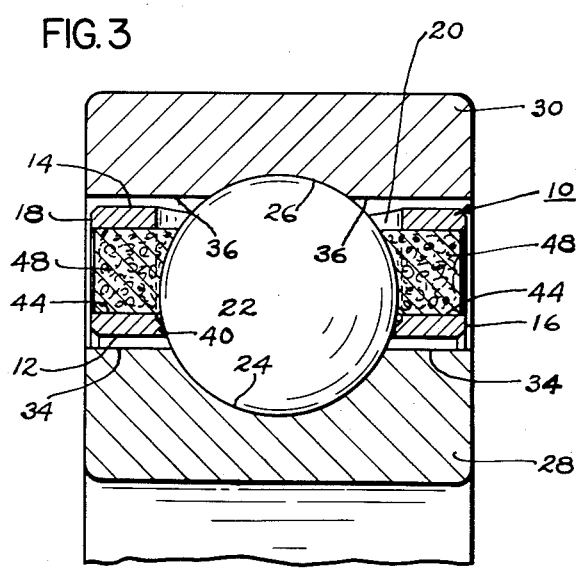
INVENTOR.
CHARLES N. HAY
BY Edward H. Goodrich.
HIS ATTORNEY

United States Patent Office 2,987,350
Patented June 6, 1961

2,987,350
SEPARATOR FOR ANTIFRICTION BEARING
Charles N. Hay, Sandusky, Ohio, assignor to General Motors Corporation, Detroit, Mich., a corporation of Delaware
Filed Feb. 12, 1959, Ser. No. 792,858
6 Claims. (Cl. 308—201)

This invention relates to separators for antifriction bearings and more particularly to a separator which circumferentially spaces a series of rolling elements and provides lubrication for these rolling elements within the bearing.

Many antifriction bearings, and particularly precision ball bearings, used in delicate mechanisms are constrained to operate for long periods under conditions of slight or marginal lubrication. In many of these bearings where the starting torque must be very low, lubrication in excess of this marginal amount is detrimental and makes the bearing unacceptable since it impedes bearing operation. Also, when bearings are operated at high speeds of rotation, excess lubrication may cause objectionable heating of the bearing which has been known to cause sudden bearing failure. Heretofore, this limited lubrication has been supplied by making the separator or cage member, which circumferentially spaces and guides the balls, of a sintered or porous material and charging the interstices in this separtor with lubricant such as a very light oil. However, this type of separator has usually provided an insufficient lubricant supply and the circumferential rubbing of the balls against the walls of the separator pockets has rapidly exhausted the lubricant supply with the result that the bearing has been short lived.

Additionally, in many installations, such as certain ball bearings used in aircraft, where failure of bearing lubrication would create a hazardous condition, there is important need for an auxiliary lubricating system in the event of failure of the supply of lubricant normally fed through the bearing and this auxiliary system should provide an emergency supply of lubricant to the bearings until the airplane reaches its home base. The very small amount of lubricant present in a porous or sintered separator is usually insufficient to provide such an emergency lubricant supply.

It is, therefore, an object of this invention to provide an improved separator arranged to supply lubricant to the rolling elements in an antifriction bearing.

It is a further object of this invention to provide an improved separator which will supply a measured amount of lubricant to the rolling elements of a bearing during bearing operation.

It is a still further object of my invention to provide an improved separator which supplies a small amount of required lubricant to the rolling elements of a bearing at and adjacent to the axis of the rolling elements during bearing operation.

It is a still further operation of this invention to provide an improved separator having an auxiliary lubricating supply for providing lubrication to the rolling elements of an antifriction bearing.

To these ends and also to improve generally upon devices of this character, the invention consists in the various matters hereinafter described and claimed. In its broader aspects, the invention is not necessarily limited to the specific structures selected for illustrative purposes in the accompanying drawings wherein—

FIGURE 1 is a fragmentary perspective view illustrating the construction of my improved separator;
FIGURE 2 is a fragmentary end view of the separator; and
FIGURE 3 is an enlarged sectional view of the separator taken substantially along the lines 3—3 of FIGURE 2.

Referring to the drawings, my improved separator, generally indicated at 10, comprises a unitary annular member having inner and outer cylindrical peripheral walls 12 and 14 and generally parallel end walls 16 and 18. Circumferentially spaced radially extending bores between the walls 12 and 14 provide circular ball pockets 20 for loosely receiving a series of rolling elements as balls 22 which are free to roll within opposed inner and outer raceways 24 and 26 formed in inner and outer race rings 28 and 30 of an antifriction bearing. In the present instance, the separator is shown radially supported for free rotation through a loose plain bearing engagement of its inner cylindrical wall 12 on cylindrical lands 34 at each side of the inner raceway 24. Lubricant within the bearing provides for antifrictional rotation of the separator on the lands 34. However, if desired, the separator 10 could be correspondingly and slidably plain-bearing supported by loose engagement of its periphery 14 with cylindrical lands 36 at each side of the outer race ring 26.

For convenience of assembly, the inner radial end of each pocket 20 terminates in an inwardly extending annular lip 40 having a diameter slightly less than that of the ball 22 to prevent the ball from falling radially inwardly through the pocket 20. This lip 40 is normally spaced sufficiently below the axis of ball rotation so that it does not engage the ball during bearing operation but yet offers sufficient opportunity for the balls mounted within the pocket 20 to be moved radially inwardly so that the separator and ball assembly can be assembled past the lands 36 to locate the balls 22 within the outer raceway 26. The annular separator 10 may be formed from bronze or other suitable metal or, if desired, may be composed of a material which may be formed in a simple molding operation under the influence of heat and pressure. Such a molded material may include various plastic materials which are resiliently yieldable, have a low coefficient of friction when in contact with a rotated metal surface, and which will not be detrimentally affected by heat, light, or bearing lubricants. A synthetic polymeric amide, commonly referred to as "nylon," and a polymeric tetrafluoroethylene, commonly known as "Teflon," are examples of various molded materials which have been found to be satisfactory for my improved separator.

One or, if desired, both separator end walls are provided with an annularly extending groove 44 which preferably has an axial depth just sufficient to break through the ball pockets forming lubricating apertures 46. A permeable lubricating ring 48 which may be composed of a hard felt or like lubricant absorbent material, is snugly fitted within each groove 44 and at each aperture 46 may enter into lightly wiping engagement with the ball 22 in the ball pocket 20 adjacent to the axis of ball rotation. The closely intermingled fibers or the felt-like ring 48 tend to hold a lubricant as oil or a light grease in the interstices between the fibers as well as a lubricant coating on the fibers. Also, considerable lubricant is held within this ring 48 by capillary attraction. Hence, this ring 48 may be initially charged with suitable lubricant and serve as a source of lubricant supply for the bearing. The lightly wiping contact of the balls against the ring 48 wipes off the small required lubricating film onto each ball which in turn distributes the lubricant to the ball pockets, raceways and to the peripheral portion of the separator 10 which rides upon cylindrical lands on one of the race rings adjacent to one of the raceways. Also, the slight compression of the felt ring 48 with the contacting balls will cause a controlled delivery of lubricant onto the balls from the ring. Additionally, in the event of heating of the bearing, internal pressures will be set up by the lubricant in the ring 48 causing lubricant to flow in greater volume from the ring onto the balls as required. In view of the lubricant retaining characteristics of the ring 48, which only engages the balls at their axial zones, it will be appreciated that only a very small and controlled amount of lubricant will be delivered to the bearing in required quantities thus providing the necessary slight amount of lubrication to the bearing over a long period of operation. This arrangement prevents the prior detrimental conditions of flood lubrication which were sufficient to impede bearing operation and materially increase the starting torque of the bearing. If desired, the axial depth of the grooves 44 may be insufficient to break through into the ball pockets and lubricant feeding apertures may be provided by providing passages from the bottoms of the grooves 44 into each pocket 20. Oil exuding from the felt ring 48 will seep through these passages and provide the required lubricant coatings on the balls. It will also be appreciated that the ring 48 may be alternatively made from other slightly yieldable porous materials whose interstices will serve as a lubricant supply which will be supplied to the rotating balls as needed.

An additional and important feature of my invention resides in the fact that my lubricating separator may be used to provide an auxiliary emergency lubricant supply in the event that a normally supplied lubricating system for the bearing is cut off. With my lubricating arrangement, and particularly as used in ball bearings for aircrafts, where an air-foil mist lubrication is fed through the bearing under pressure during bearing operation, the separator in such a bearing when made in accordance with my invention provides an emergency lubricant supply and prevents bearing failure in the event of failure of the usual lubricating system. Hence, the danger to the aircraft and its occupants would be alleviated and the plane could be permitted to safely reach its home base.

I claim:

1. In a separator for guiding the rolling elements in an antifriction bearing, an annular member having a series of circumferentially spaced rolling element-receiving pockets radially extending therethrough, an intermediate wall separating each pair of adjacent pockets throughout the radial extents of said pockets, an annular end separator wall having an arcuate groove extending past a plurality of said pockets, said groove opening outwardly throughout its length through said wall, the bottom of said groove at circumferentially spaced locations breaking through and opening into the pockets at the side walls of said pockets, and a lubricant absorbent member fitted within said groove, the bottom of said lubricant absorbent member projecting from the groove at said spaced locations for light contact with the rolling elements in said pockets.

2. In a separator for guiding the balls in a ball bearing, an annular member having a series of circumferentially spaced circular ball pockets radially extending therethrough, an intermediate wall separating each pair of adjacent pockets throughout the radial extents of said pockets, an annular end wall on said annular member, said end wall having an arcuate groove formed therein and extending past a plurality of the ball pockets, said groove opening throughout its length axially outwardly through said end wall, the bottom wall of said groove being interrupted by an aperture opening through a portion of the side wall of one of said pockets about the axis of ball rotation in said pocket, and a permeable lubricating member seated within the groove and extending through the aperture into the side pocket for lubricating engagement with the ball in the pocket adjacent the axis of ball rotation.

3. In a separator for guiding the balls in a ball bearing, an annular member having a series of circumferentially spaced circular ball pockets radially extending therethrough, an annular end wall on said annular member, the end wall having an annular groove opening outwardly through said end wall and extending past the ball pockets, the bottom of said groove breaking through a side wall of each pocket at circumferentially spaced locations, and a lubricant absorbent ring filling said groove, the inner wall of said ring extending from the bottom of the groove at said spaced locations into light engagement with the balls in said pockets to provide for a controlled predetermined lubrication for said balls.

4. In a separator for guiding the balls in a ball bearing, an annular member having substantially cylindrical inner and outer peripheries and having circumferentially spaced circular ball pockets radially extending between said peripheries, intermediate circumferentially spaced walls respectively separating adjacent pockets throughout their radial extents, an annular end wall at each end of the annular member, each end wall having an annular groove opening axially outwardly therethrough and extending past the ball pockets, the grooves being of an axial depth to open at circumferentially spaced locations into each ball pocket in a small area including the axis of rotation of a ball within each pocket, and a lubricant absorbent yieldable ring seated in each groove and extending across the pocket opening for a controlled lubricating engagement with the balls adjacent their axes of rotation.

5. In a separator for guiding the rolling elements in an antifriction bearing, an annular member having a series of circumferentially spaced rolling element-receiving pockets, said member having intermediate walls which prevent direct communication between adjacent pockets, an annular wall on said member provided with a circumferentially disposed groove extending past a plurality of said pockets, a permeable lubricant supplying member fitted within said groove, and said annular member having intermediate the length of the groove an aperture extending from the bottom of the groove into one of said pockets whereby lubricant from said aperture supplying member will be selectively directed into one of said pockets.

6. In a separator for guiding the rolling elements in an antifriction bearing, an annular member having a series of circumferentially spaced rolling element-receiving pockets extending radially therethrough, a wall between each pair of adjacent pockets and separating said adjacent pockets through their radial extents, an annular wall at each end of the annular member, each annular wall having therein a circumferentially disposed groove opening axially outwardly through said wall and extending past a plurality of said pockets, a permeable lubricant supplying ring fitted within and substantially filling each groove, and said annular member having a plurality of circumferentially spaced passages extending from the sides of the pockets into the bottom of said groove, said passages delivering lubricant selectively into said pockets is controlled amounts.

References Cited in the file of this patent

UNITED STATES PATENTS 980,101     Hess                 Dec. 27, 1940

FOREIGN PATENTS 25,276     Great Britain            1908